Oct. 19, 1971  YOSHIKAZU SATO ETAL  3,613,225
TOOL CHANGER FOR MACHINE TOOL
Filed June 12, 1969  5 Sheets-Sheet 1

INVENTOR
Yoshikazu Sato
Susumu Ogasawara
BY Harold L. Halpert
Agent

Oct. 19, 1971    YOSHIKAZU SATO ETAL    3,613,225
TOOL CHANGER FOR MACHINE TOOL
Filed June 12, 1969    5 Sheets-Sheet 3

INVENTOR.
Yoshikazu Sato
BY Susumu Ogasawara
Harold L. Halpert
Agent

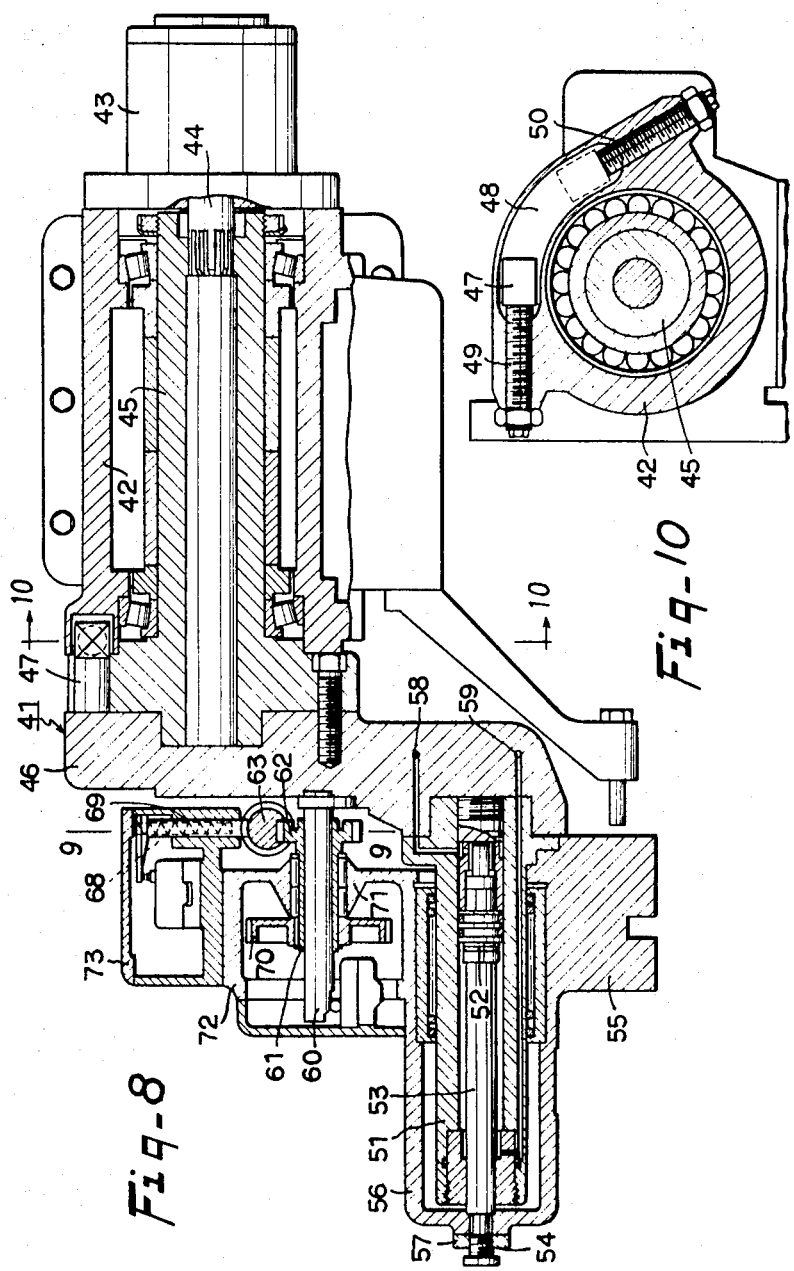

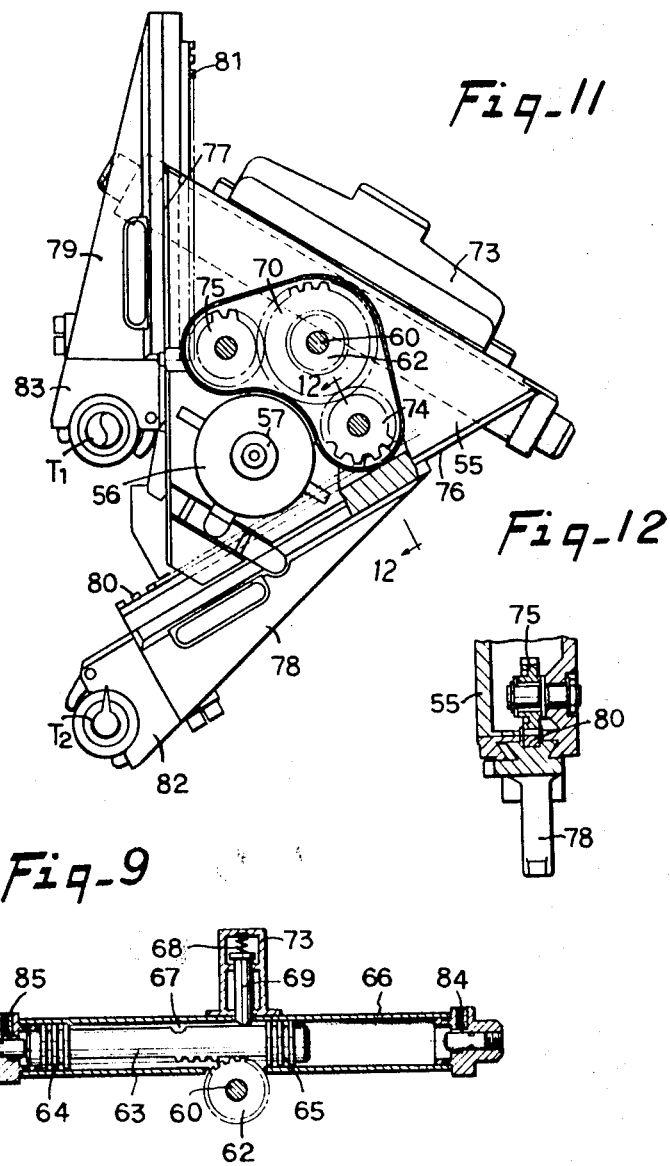

United States Patent Office 3,613,225
Patented Oct. 19, 1971

3,613,225
TOOL CHANGER FOR MACHINE TOOL
Yoshikazu Sato, 1026, 4-chome, Shimotakaido, Suginami-ku, Tokyo, Japan, and Susumu Ogasawara, 57 Hatsue-gaoka, Hodogaya-ku, Yokohama-shi, Kanagawa-ken, Japan
Filed June 12, 1969, Ser. No. 832,764
Claims priority, application Japan, June 18, 1968, 43/41,641
Int. Cl. B23q 3/157
U.S. Cl. 29—568       4 Claims

ABSTRACT OF THE DISCLOSURE

A tool changer for changing tools in a machine tool in accordance with a preselected schedule. A body comprising a pair of converging ways is oscillated by a data controlled servo motor between a pair of positions. In the first position an arm carried by one of the ways grasps a selected tool from storage and lifts it away from the storage position. In the second position the tool is inserted in the tool spindle for operating on a work piece. An arm carried by the other of the ways removes the tool from the spindle when the work operation is completed and returns it to storage. Synchronized fluid motors are used to operate the movement of the arms.

---

This invention pertains to an automatic tool changing means and an automatic tool changing device for use in a data tape controlled machine tool.

More precisely, the device consists of a new tool changing arm for grasping and loading a new tool and an old tool changing arm for grasping and removing a used tool. Said arms are slidably mounted and mechanically linked to move in sequence along the sides of a triangular main casing which is rotatably and slidably mounted on the machine, said arms being positioned so that in their fully extended state, the grip of each arm coincides with the axis of the cutting tool, and thus provides means for removal of the used tool and loading of the new tool in the main spindle of a machine tool by the interconnected reciprocating motion of the tool changing arms, whereby the tool changing cycle can be made extremely short.

In heretofore known automatic tool changing devices, a single rotatably mounted arm, or two independent slidably mounted arms are utilized. The former system necessitates rotation of the arm after removal of the used tool and before insertion of the used tool. The time during rotation is lost time. This time can become considerable when one machining operation requires many tool changes. The latter system is prone to cause disruptions in the tool changing function caused by misalignment and mistiming of the independently driven tool changing arms. The inventors of the instant invention developed the device after extensive research and experimenting to overcome the drawbacks of the aforementioned known systems.

An important object of this invention is to provide a tool-changing device which will transfer a designated tool from a tool storage magazine to the main spindle by means of data-tape control.

Another object of this invention is to provide a device wherein two slidably mounted arms are interconnected to move reciprocally in opposite directions.

Another object of this invention is to provide a mechanical system wherein two racks each attached to a tool changing arm are slidably mounted to engage two identical gears rotating in the same direction said gears being driven by a central system of gears rotated by a single rack moved by tape-controlled hydraulic pressure.

Figure 1:
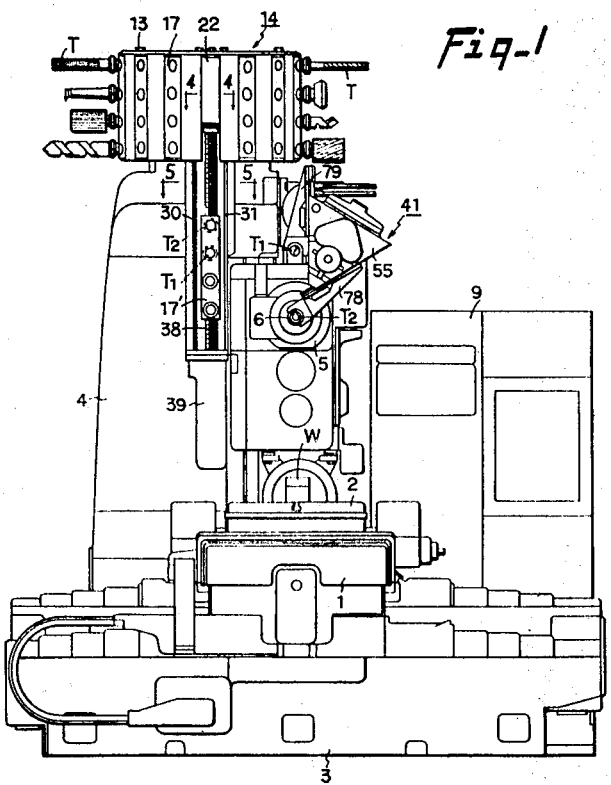
Figure 7:
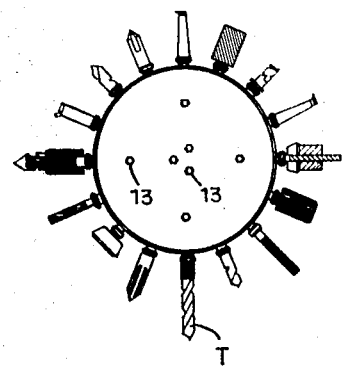
Figure 6:
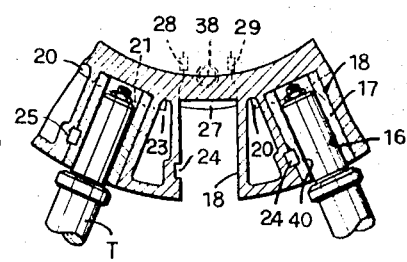
Figure 2:
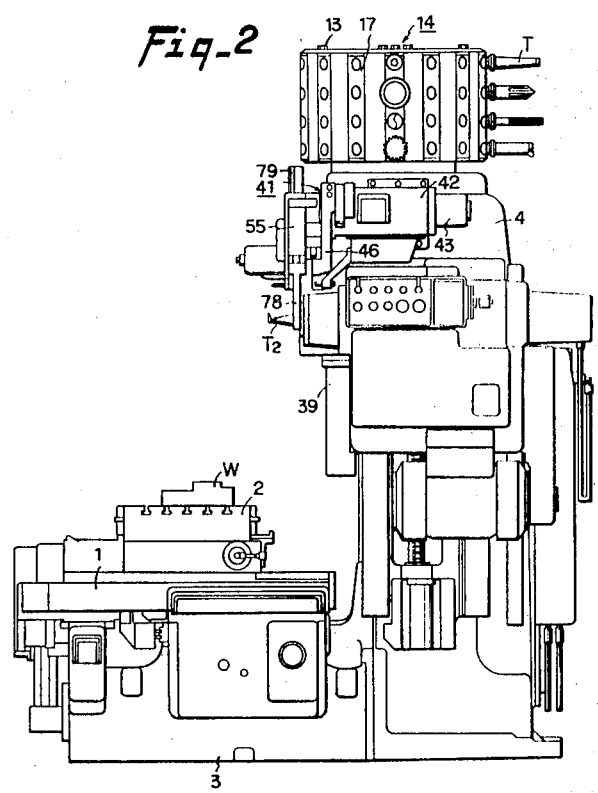
Figure 3:
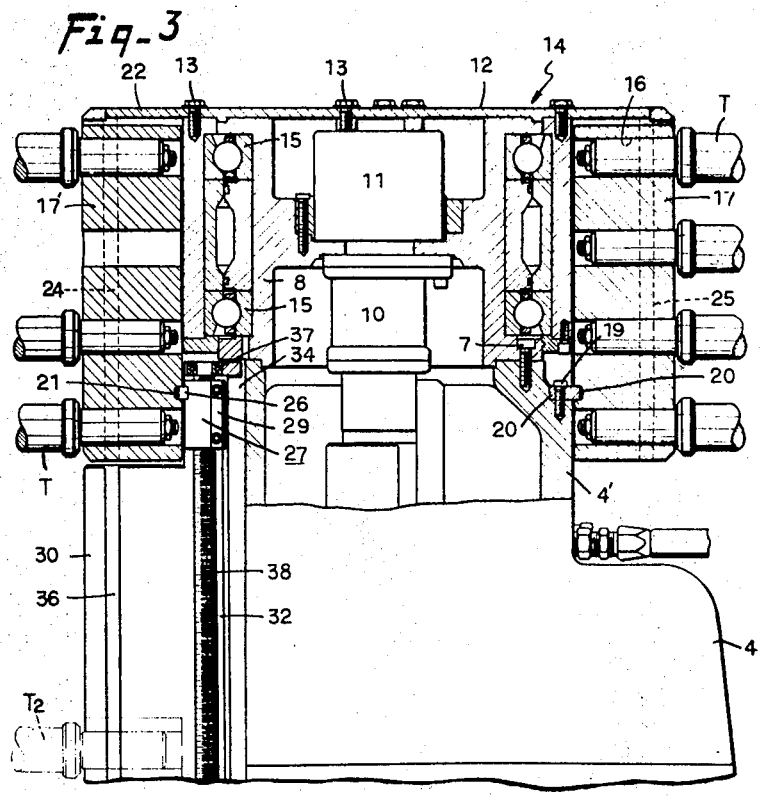
Figure 4:
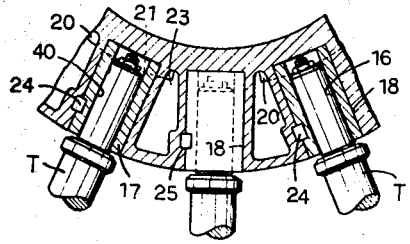
Figure 5:
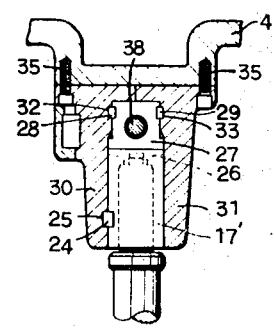

These and other objects of the invention will become manifest upon reading the following description in conjunction with the accompanying drawings wherein:

FIG. 1 is an elevation view showing a designated cartridge lowered to the tool changing position. The new tool gripped by the new tool changing arm having been removed from the cartridge and placed in the tool spindle. The used tool gripped by the used tool changing arm after having been removed from the tool spindle is elevated to the depicted position ready to be swivelled and placed in the cartridge, FIG. 2 is a side view of FIG. 1, FIG. 3 is an enlarged view partly in section showing details of the tool storing magazine, FIG. 4 is a segmental view partly in section taken along the line 4—4 of FIG. 1, FIG. 5 is a view partly in section taken on the line 5—5 of FIG. 1, FIG. 6 is a segmental view partly in section taken along the line 4—4 of FIG. 1 with the cartridge removed, FIG. 7 is a plan view of the magazine, FIG. 8 is an enlarged view partly in section showing details of the tool changing mechanism, FIG. 9 is a view partly in section taken on the line 9—9 of FIG. 8, FIG. 10 is a view partly in section taken on the line 10—10 of FIG. 8, FIG. 11 is a partially sectioned plan view of the tool changing mechanism, and FIG. 12 is a view partly in section taken on the line 12—12 of FIG. 11.

Index table 2 is slidably mounted on work table 1 which has feed devices for moving it in a perpendicular or transverse direction. Main spindle head 5 is mounted on the side surface of column 4 which rises vertically from bed 3, said spindle head being mounted on slides and moved vertically by a lead screw. Spindle head 5 carries the main bearings for tool spindle 6, said spindle being driven by a transmission system contained within the spindle head housing. Spindle head 5 moves vertically, up or down, along axis Y whereas the work to be machined is mounted on index table 2 which is secured to work table 1 which in turn is movable in the axis X and axis Z directions. By controlling the feed of the spindle head and work table, machining of the work W can be performed.

A flat cylindrical magazine 14 is attached to top plate 12 of reduction gear housing 11 by screws 13. Servo motor 10 is mounted inside cylindrical housing 8 which is attached to protrusion 4' formed on the extreme top end of vertical column 4, said motor 10 receiving control current from control apparatus 9. Magazine 14 rotates around cylinder 8 on ball bearings 15 and is rotated by rotating force furnished through attached top plate 12. Tool holding cartridge 17 has tool holding holes 16 which are arranged vertically in a row to hold tools T, T1, T2 . . . Tn. Magazine 14 has, on its outside periphery, grooves 18 which mount cartridges 17 parallel to the axis of magazine 14, and protrusion 4' of column 4 has retaining ring 20 attached by screws 19, said retaining ring 20 has a cut out portion 23 which is slightly larger than groove 18 which is positioned to coincide with cartridge removal position 22, whereby the cartridge once placed in the magazine cannot be removed or loaded unless the cylindrical magazine is positioned at 22.

To position the cartridge on its downward travel, lead screw sliding nut assembly 27 has key member 26 which engages retainer groove 21 of cartridge 17 when it is in position 22, retainer blocks or keys 28 and 29, mounted vertically on both sides of sliding nut assembly 27, engage positioning grooves 32 and 33 of retaining castings 30, 31 mounted on column 4 by screws 35. As explained before, key 26 fills the gap 23 formed in cartridge retaining ring 20. Casting 30 has retaining groove 36 which retains the cartridge 17 from sliding outwards by key 24 mounted in cartridge 17. Sliding nut assembly 27 has lead screw 38 which is supported by upper bearing 37. The bottom part of lead screw 38 is attached to servo motor 39. Spring 40 engages the cutting tool when it is inserted into hold 16 and thereby prevents the cutting tool from falling out of the cartridge.

As an alternative type of construction, retainer ring 20 could be a groove formed into storage magazine 18, and instead of a groove 21 in cartridge 17, a key block could be mounted in cartridge 17.

Tool changing mechanism assembly 41 is fixedly mounted on one side of column 4 and comprises in general, a main cylindrical housing 42 containing and supporting on journalled bearings a hollow shaft 45 driven by splined shaft 44 of servo motor 43 at one end and supporting swivelling plate 46 on the other end. Motion of plate 46 is limited by pin 47 which is perpendicularly supported by the plate and positioned to move in a radial groove 48 formed in the face of housing 42 between limiting screws 49 and 50 adjustably mounted at both extremities of the radial groove as shown in FIGS. 8 and 10. Swivelling plate 46 supports hydraulic cylinder 51 containing piston 52 and piston rod 53 which is concentrically mounted in cylinder casing 56 by screw 54 and nut 57. When oil flowing through passages 58 and 59 drive piston 52, main body casing 55 slides outwardly guided by the outer surface of cylinder 51 and the bearing surface fitted in bore of casing 55.

Shaft 60 is fixedly supported perpendicularly from the surface of swivelling plate 46. A small pinion gear 62 is attached to the extremity of sleeve 61 which is rotatably and slidably free to move on shaft 60. Pinion gear 62 engages rack 63 which carries pistons 64 and 65 and which are slidably mounted within common cylinder 66. Notch 67 is located in the center of the rack and is engaged by pin 69 tensioned by spring 68 within a bore formed in housing 73 to center rack 63 in the central position. When oil pressure acts against piston 64 or 65, rack 63 slides to rotate gear 62. Sleeve 61 attached to pinion gear 62 has a main gear 70 fixedly attached to the opposite end. The mid-portion of the sleeve 61 is rotatably supported by bearings journalled in bore 71 of main casing 55. The upper part of the casing 72 has cover 73 covering pin 69.

Main casing 55 with cylindrical protrusion 56, sleeve 61, main gear 70 pinion gear 62, rack 63, pin 69 and cover 73 comprise a single assembly which swivels with plate 46 and is slidably mounted thereon by shaft 60 and the outer surface of cylinder 51. Main gear 70 meshes with two identical gears 74 and 75 symmetrically positioned thereto and rotatably mounted on main casing 55. New tool changing arm 78 and used tool changing arm 79 are slidably mounted on equilateral surfaces 76, 77 formed on main casing 55, and racks 80 and 81 attached to tool changing arms 78 and 79 are positioned to engage with gears 74 and 75. Both tool changing arms 78 and 79 mount tool gripping mechanisms 82 and 83 at their extremities. When main gear 70 rotates, gears 74 and 75 rotate to slide new tool changing arm 78 and used tool changing arm 79 in opposite directions by means of the racks 80 and 81. A solenoid valve (not shown) connected to cylinder 66 is positioned to cut off when pin 69 engages notch 67 of rack 63 and thereby stops the sliding motion of tool changing arms 78 and 79 in the neutral position. During this period, main casing 5 is swivelled by servo motor 43 and this determines the direction of motion of the tool changing arms. The series of motions of the tool changing mechanism is controlled in sequence with the tool changing operation of the machine tool by means of data tape control mechanism 9.

The invention as described above is placed in motion by oil pressure which is controlled by means of data tape control mechanism 9. Servo motor 10 rotates magazine 14 through speed reducing transmission 11. Cartridge 17' containing the new tool for the next machining operation is placed at cartridge removal position 22 and cartridge locking groove 21 located on the bottom backside of the cartridge is engaged by key 46 of sliding nut 27. Feed screw 38 driven by servo motor 39 transports nut 27 with cartridge 17' downwards, guided by guide walls 30 and 31. Cartridge 17' stops when new tool T2 reaches the tool ready position. During this cycle of operation pin 69 is engaged in notch 67 of rack 63 within cylinder 66 and the new and old tool changing arms 78 and 79 are in neutral position. In this position main casing 55 is swivelled by plate 46, driven by servo motor 43, so that positioning pin 47 is held against limiting screw 50 whereby new tool changing arm is positioned to grip new tool T2. When oil pressure is applied to port 84 of cylinder 66 to enter the right-hand side of piston 65, rack 63 slides in a leftward direction, pinion 62 meshing with rack 63 rotates in an anticlockwise direction. Pinion 62, through rotation of sleeve 61 and main gear 70, rotates gear 74 in a clockwise direction. This in turn moves new tool changing arm 78 to engage tool T2 through motion of rack 80 which is mounted with the tool changing arm and is meshed with pinion gear 74. Tool T2 is gripped by gripping mechanism 82. In this position of the new tool changing arm, used tool changing arm is in the extreme retracted position. Next, when pressurized oil is applied to the right-hand side of piston 52, main casing 55 will slide leftward along the axis determined by shaft 60 and cylinder 51. New tool changing arm 78 will move the casing 55 and new tool T2 gripped by grip 82 will be removed from tool socket 16 of cartridge 17. At the same time, pressurized oil is applied to the left side of piston 64 through port 85 and rack 63 will be moved to the right and when pin 69 engages notch 67 the oil path will close to stop motion of rack 63. Due to the movement of rack 63 with pinion 62 sleeve 61, main gear 70, and gears 64 and 65, new tool changing arm 78 will be retracted while used tool arm 79 will be extended to stop at mid-position or the "neutral" position.

In the next step of the cycle of operation, servo motor 43 swivels main casing 55 with plate 46 so that limiting pin 47 abuts adjusting screw 49 and stops, after which pressurized oil is applied to oil path 59 and piston 52 moves piston rod 53 to move main casing 55 to return to its original position by sliding along cylinder 51 and shaft 60. At the same time pressurized oil is applied to port 84 of cylinder 66 which moves rack 63 leftwardly. Through rotation of the gear train, new tool changing arm 78, which is gripping the new tool T2, will retract and used tool changing arm 79 will become extended. At this phase of the operation, used tool changing arm grip mechanism 83 will be positioned directly over main tool spindle 6.

In the next step of the cycle, the collet (not shown in the drawing) holdng the tool in the main spindle 5 is opened to release the tool and at the same time main spindle head 5 is moved upwardly along axis Y. Used tool T1 mounted in main spindle head 5 is gripped by grip 83 of used tool changing arm 79. After gripping of the tool is completed, tool changing arms 78 and 79 with main casing 55 is moved outwardly by piston 52 and used tool T1 is removed from tool spindle 6. When rack 63 is moved by oil pressure to the position depicted in FIG. 11 and the axis of the new tool T2 coincides with the axis of the main spindle, pressurized oil is admitted as previously described to piston 52 within cylinder 51, and tool changing arms 78 and 79 with main casing 55 is retracted. By this motion new tool T2 will be inserted into the collet of the main spindle after which spindle head is lowered along the Y axis to the machining operation position and machining of the work to be machined is started.

After new tool T2 is mounted, oil pressure is applied to piston 64 of cylinder 66 and rack 63 is moved till pin 69 engages notch 67 by the above described motion. The new and used tool changing arms 78 and 79 are placed in neutral position and main casing 55 with arms 78 and 79 is moved outwardly by piston 52. When servo motor 43 is driven, and plate 46 is swivelled with main casing 55 till pin 47 abuts against limiting screw 50, pressurized oil is applied to piston 64, contained within cylinder 66, so that rack 63 is moved in a rightward direction and thereby extending the used tool changing arm 79. Used tool T1 gripped in the grip 83 of arm 79 is moved forward so that the center of used tool T1 coincides with the now empty socket of the used tool, or any other designated socket located at the tool changing position, after which main housing 55 is retracted to insert the used tool T1 into the designated socket. After used tool T1 is inserted, tool changing arms 78 and 79 are returned to neutral position and in the above described manner a tool changing cycle is completed by the machine. This tool changing cycle is automatically controlled and repeated, by electronic control.

What we claim is:

1. A tool changer for a machine tool having a rotatable spindle comprising a magazine for storing a plurality of cartridges, a plurality of tools mounted in each of said cartridges, means for shifting one of said cartridges from the magazine into a tool ready station, and means for transferring a selected tool from the said one of said cartridges in the tool ready position to the spindle for operating on a workpiece and for returning said selected tool from the spindle to the cartridge, said transferring means comprising a body having a pair of converging ways, tool grasping arms slidably mounted on said ways, means for oscillating said body between a first position in which said arms can be extended over the cartridge and a second position in which the arms can be extended over the spindle, and means for shifting said body normal to the plane of oscillation in each of said positions, said means for shifting comprising a fluid motor in said body and conduit means connecting said fluid motor to a source of pressure, further including a rack carried by each arm, a fluid motor mounted in the body, and a gear train connecting the fluid motor with each rack, wherein the fluid motor comprises a cylinder in said body, a piston in the cylinder, and a rack formed in the piston and wherein the gear train comprises a pinion engaged with each rack, a gear in engagement with the pinions engaged with the rack on each arm, and means drivingly engaging the gear and the pinion engaged with the rack in the piston whereby movement of the piston will slide one arm away from the point of convergence of the ways and the other arm toward said point.

2. A tool changer as defined in claim 1 wherein the means for oscillating the body comprises a servo motor, a plate connected to the motor, and means mounting the body on the plate.

3. A tool changer as defined in claim 1 further including means for locking said arms midway of their movement on the ways.

4. A tool changer as defined in claim 1 further including means for locking said arms midway of their movement on the ways, said latter means comprising a notch centered btween the ends of the piston and a plunger for engaging the notch.

References Cited
UNITED STATES PATENTS

| | | | |
|---|---|---|---|
| 3,286,344 | 11/1966 | Brainard et al. | 29—568 |
| 3,327,386 | 6/1967 | Jerue | 29—568 |
| 3,355,798 | 12/1967 | Drechsler | 29—568 |

ANDREW R. JUHASZ, Primary Examiner

F. R. BILINSKY, Assistant Examiner